Dec. 16, 1924.

H. C. FORD

ELECTRIC MOTOR

Original Filed Oct. 10, 1917  2 Sheets-Sheet 1

1,519,675

Dec. 16, 1924.
H. C. FORD
ELECTRIC MOTOR
Original Filed Oct. 10, 1917   2 Sheets-Sheet 2
1,519,675
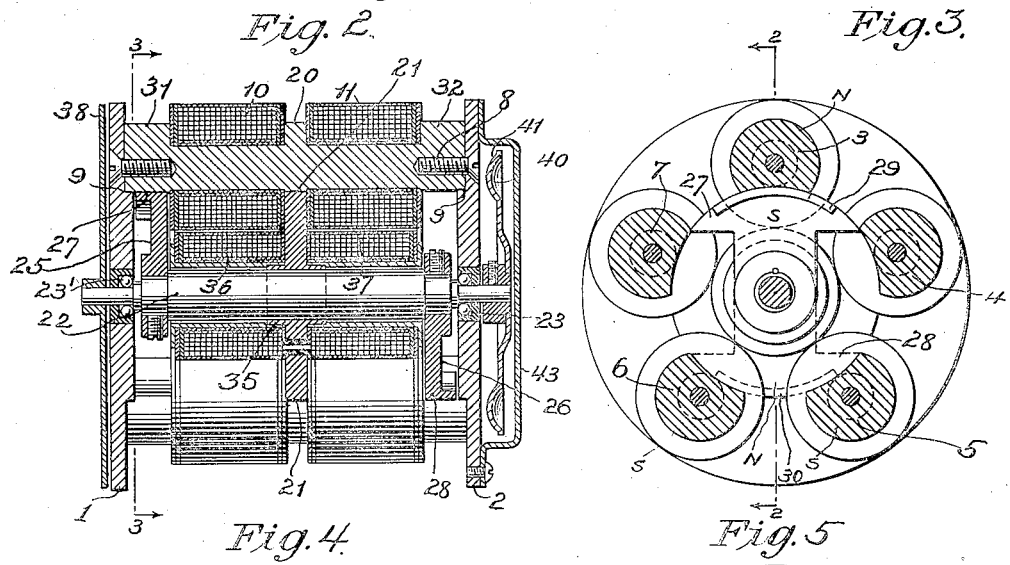
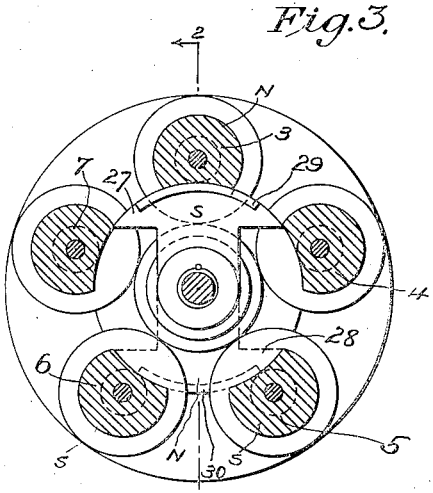
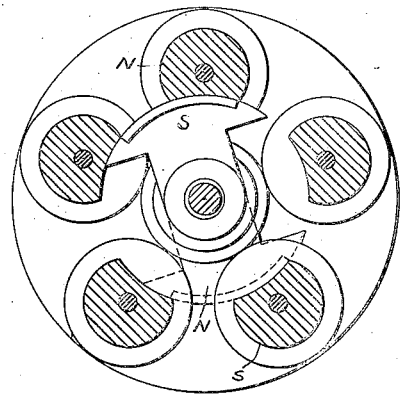
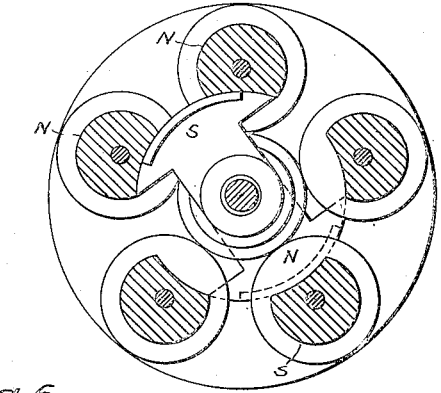
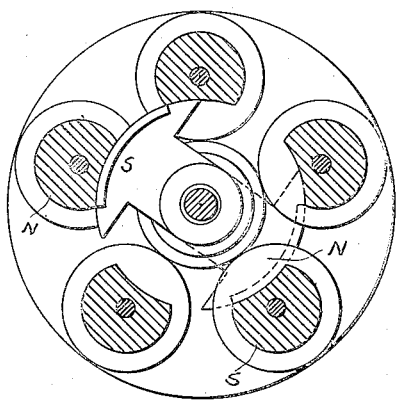
INVENTOR
BY
ATTORNEY Patented Dec. 16, 1924.

1,519,675

UNITED STATES PATENT OFFICE.

HANNIBAL C. FORD, OF JAMAICA, NEW YORK, ASSIGNOR TO FORD INSTRUMENT COMPANY, INC., OF LONG ISLAND CITY, NEW YORK, A CORPORATION OF NEW YORK.

ELECTRIC MOTOR.

Original application filed October 10, 1917, Serial No. 195,692. Divided and this application filed October 8, 1920. Serial No. 415,577.

*To all whom it may concern:*

Be it known that I, HANNIBAL C. FORD, a citizen of the United States, residing at Jamaica, in the borough of Queens, State of New York, have invented new and useful Improvements in Electric Motors, of which the following is a specification.

This invention relates to a receiver motor of the electromagnetic type especially adapted for use as a part of a step by step signal system. The application is a division of my copending application, Serial No. 195,692, filed October 10th, 1917, Patent No. 1,420,030, issued June 20, 1922, for a signal system.

The primary object of the invention is to provide a receiver motor having four steps for each pole which when the coils thereof are energized in a particular sequence will be self-synchronizing, i. e. the armatures of the receiver motor can only occupy one angular position to correspond to one set of circuit connections and will resume this position even should the source of electric energy be temporarily disconnected and the armature moved from its correct position.

Other objects of the invention as well as the features of construction which are deemed to be novel will be hereinafter described and particularly pointed out in the appended claims. In the drawings—

Figure 2 is a central section through a receiver motor embodying the features of the invention.

Figure 3 is a section on the line 3—3 of Fig. 2 and—

Figures 4, 5 and 6 are similar views of Fig. 3, showing the three other positions of the armature for a pole of the motor.

Figure 1:
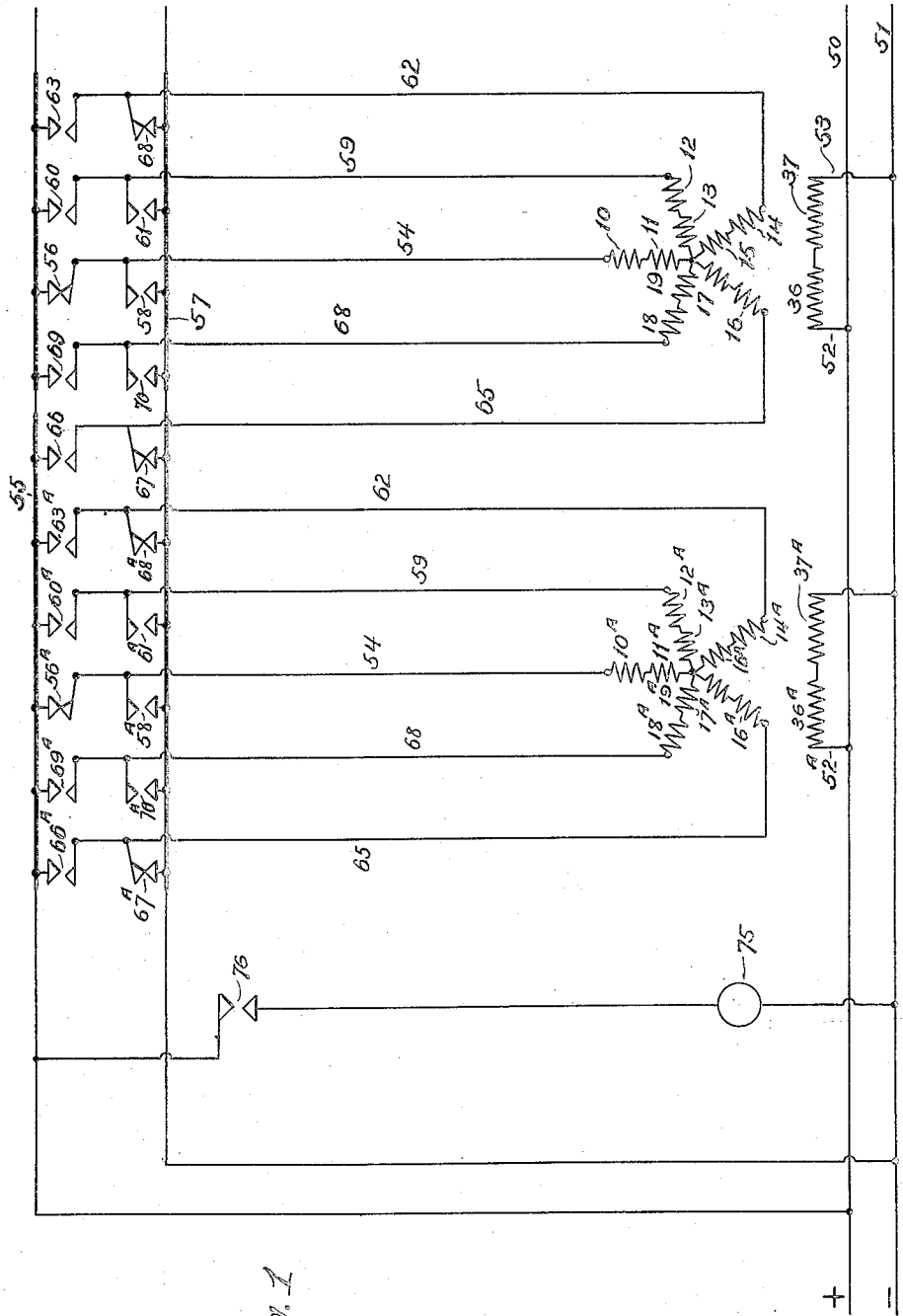
Figure 1 is a diagram of the circuit connections.

Referring first to Figure 2 of the drawing, the constructional features of the motor will first be described. Two end plates 1 and 2, which are circular in shape, support between them a plurality of iron cores or poles. In the construction shown, five of these poles are utilized, being designated 3, 4, 5, 6 and 7. These cores are equally spaced apart and are secured to the end plates by screws 8, and the end plates being preferably recessed as at 9 for the reception of the ends of the poles.

Mounted upon each of the cores or poles 3, 4, etc. are two coils which are of the usual construction and are designated 10, 11, 12, 13, 14, 15, 16, 17, 18 and 19, (see Figure 1 of the drawing). The cores 3, 4 etc. are each preferably provided with a shoulder 20 to maintain the field coils properly spaced thereon. Diametrically opposite the shoulder 20, each of the cores 3, 4, etc. is curved circumferentially on a radius having a center coincident with the center of the annularly arranged field poles. Fitting against the curved surfaces thus formed is a circular plate 21. The plate 21 is provided with a central opening through which an armature shaft 22 passes, which shaft has reduced end portions mounted in ball-bearings 23 and 23' supported in the end plates 1 and 2. The armature shaft is thus supported for rotation and removably and adjustably secured to it at its ends, as by the set screws shown in Fig. 2, are two armatures 25 and 26, each of which have segmental shaped tops 27 and 28 from which project laterally segmental shaped flanges 29 and 30. The cores 3 and 4, etc. are enlarged at each end to provide field pole pieces 31, 32, etc. These pole pieces are concaved as shown in Figures 3, 4, 5, and 6, and have a radius of curvature which is coincident with the center of the armature shaft and also with the radius of curvature of segmental shaped pieces 27 and 28 of the armatures. The width of each pole face and the space between adjacent pole faces are all equal, each being in the five pole motor shown one-tenth of a circumference. The segmental shaped tops 27 and 28 of the armatures are of a width equal to three pole faces, i. e. of a width to space two pole faces in which position armature 26 is shown in Figure 5. The flanges 29 and 30 are of a width equal to two pole faces or to the polar interval which in the construction shown is one-tenth of a circumference.

The circular plate 21 is provided with a hub 35 adjacent to the central opening therethrough which hub supports two magnetizing coils 36 and 37 which polarize the armatures 25 and 26 as will be hereinafter described. The coils 36 and 37 are stationary and the armature shaft with the armatures 25 and 26 revolve freely in its ball-bearings. The armature shaft also carries a dial 38 upon which appropriate symbols may be placed which denote the different angular positions of the armatures.

To damp the oscillatory movement of the armature shaft and the armatures 25 and 26 which might be caused by the successive energizations and de-energizations of the field poles as will hereinafter be described, a damping plate or fan 40 may be utilized which fan may comprise a circular disc upon the end of the armature shaft, the disc being stamped or pressed to provide a series of protuberances 41. This damping disc is preferably closed in a suitable chamber formed by the end plate 2 and a dish shaped cover 43, the chamber being preferably filled with some damping medium such as a liquid. It is understood that if desired, this damping device may be eliminated.

In the specific embodiment of the invention shown, a five pole receiver motor is provided and the armatures 25 and 26 are adapted to assume four different positions for each pole so that in all, twenty (20) different angular positions of the dial 38 may be obtained. The number of positions of the receiver motor is due to the peculiar shape of the armature and the sequence in which the field coils are energized and to the polarization of the armature.

Referring now to Figure 1, a diagram of the electric connections is shown in which the field coils for each core of the motor have been designated 10, 11, 12, etc. and the two coils which polarize the armatures 25 and 26 have been designated 36 and 37. The two polarizing coils 36 and 37 are preferably permanently connected to a source of electrical energy as represented by the line wires 50 and 51 in the diagram, the coils being connected to these wires by wires 52 and 53. The field coils for each pole are in series and the coils for the five poles form a star connection as shown in Figure 1. The coils 10 and 11 are connected by a wire 54 to the positive line wire 55 through a switch 56 and also connected by the wire 54 to the negative line wire 57 through a switch 58; the coils 12 and 13 are connected by wire 59 to the positive and negative line wires by switches 60 and 61 respectively; the coils 14 and 15 by wire 62 and switches 63 and 64; the coils 16 and 17 by wire 65 and switches 66 and 67; and the coils 18 and 19 by wire 68 and switches 69 and 70. The switches 56 and 58, 60 and 61, etc. are adapted to form a part of a transmitter such as is shown in my copending application Serial #195,692, but any other form of transmitter may be utilized which will energize the circuits in the desired sequence.

Another receiver motor of a similar construction is diagrammatically disclosed in Figure 1. The coils being designated $10^A$, $11^A$, $12^A$, etc. and the switches $56^A$, $58^A$, etc. it being understood that the construction of this receiver motor is the same as the one disclosed in Figure 2 and need not further be described. If desired also a signal lamp 75 may also be supplied for indicating at a receiver motor when a signal is being transmitted, the circuit to the lamp being controlled by switch 76.

The pair of field coils of each pole are preferably wound so that the pole face on opposite ends of the cores 3, 4, 5, etc. will be of like polarity, as for example by closing the switch 56, the two pole faces at the ends of the core 3 will be energized positively to provide two north poles and vice versa when the coils are connected to the negative line wire by which 58 the two pole faces will be both south poles. In counter distinction to this, the two magnetizing coils 36 and 37 which surround the armature shaft are wound so that the two armatures 25 and 26 will permanently remain energized of unlike polarity as long as the source of electric energy is passing through the system. In the system shown these coils are so wound that the armature 25 is energized to provide a south pole and the armature 26 to provide a north pole. It is evident that if the field coils were wound in the opposite directions so that an N. and S. pole would be formed at the ends of the cores 3, 4, etc. and the coils 36 and 37 were wound in the same direction so that two N. and S. poles would be produced, the result would be the same.

Referring now to the operation by means of which the receiver motor is actuated whereby the armature assumes four definite positions for each pole. In Figure 3 three poles are energized that is, the core 3 is energized by closing the switch 56 so that the pole faces at the end of the core are both north poles. The cores 5 and 6 are energized by closing the switches 68 and 67 so that the pole faces at both ends of these cores form south poles. Under this condition, the armature 25 which is a south pole is attracted by one of the north pole faces of the core 3 and the armature 26 which is a north pole is equally attracted by the south poles at the opposite ends of the cores 5 and 6. The two armatures therefore, assume the position shown in Figure 3, in which the armature 26 spans both of the pole faces of the cores 5 and 6 and the armature 25 occupies a middle position with respect to the pole face of the core 3. Let us assume now that the power be temporarily disconnected and the armature shaft revolved through an angle of 180 degrees and the power again connected to the receiver motor without disturbing the circuit connections. The armature 26 which is a north pole would then be opposite the north pole of the core 3 and the armature 25 which is a south pole would be opposite the two south poles 5 and 6. The result is that the armature would then be in an unstable condition and the mutual repulsive and attractive forces acting on the armature would cause them to rotate and resume the positions shown in Figure 3, i. e., until they again moved through an arc of 180 degrees to take up their original position. This movement of the armatures renders the system self-synchronizing since it is clear from the above that when one set of switches is closed, the armatures can only be in one angular position corresponding to this particular circuit connection.

In Figure 4, the first intermediate step from that shown in Figure 3 is shown. In order to obtain this step only two of the poles are energized, i. e., the pole 3, remains energized a north pole but the circuit to the pole 6 is disconnected by opening the switch 67, leaving the circuit to the pole 5 closed. The armatures 25 and 26 will then move to the position shown in Figure 4 until the attractive forces upon both armatures become equal, which will occur when the right hand end of the flange 29 upon the armature 25 is coincident with the right hand edge of the pole faces of core 3 and the right hand edge of the flange 30 upon the armature 26 is coincident with the right hand edge of the pole face of the core 5. It is in this position of the armatures that the flanges 29 and 30 center the armatures in a definite position.

The third intermediate step is shown in Figure 5, where the poles 3 and 7 are energized to provide two north poles and the pole 5 still remains energized as a south pole. The armature 25 will then assume a position in which the armature spans the pole faces of the cores 3 and 7 with the armature 26 medially disposed with respect to the pole face of the core 5.

The fourth step is shown in Figure 6 which is obtained by de-energizing the coils surrounding core 3 and keeping the coils of the cores 7 and 5 energized as north and south poles respectively. This position is somewhat similar to the position shown in Figure 4 with exception that the left hand edge of the flange 29 is in coincidence with the left hand edge of the pole face 7 and the left hand edge of the flange 30 of the armature 26 is in coincidence with the left hand edge of the core 5. For the next step, the cores 4 and 5 would be energized to provide two south poles 4 and 5 and one north pole 7 in which case, the armature 26 would be medially arranged with respect to the core 7 as it is with respect to core 3 as shown in Figure 3, the armature would then again make four steps in passing from the core 7 to the core 6, the switches being closed to alternately and necessarily energize two and then three of the poles of the motor in the same manner as has already been described.

It is also evident that in each of the intermediate positions, if the armatures are in any position should the power be temporarily disconnected, the attractive forces will be such that it will tend to pull it towards the position in which it is shown so that the armature can only assume one position for each set of circuit connections.

From the above, it is also evident that with a five pole motor twenty steps may be obtained in each of which positions the armatures assume a different angular position so that the dial 38 will assume twenty definite angular positions. It is also evident that should the circuit from the switches or transmitter to the receiver motor be temporarily disconnected by failure of the source of electrical energy or for other reasons, the armatures will assume their correct positions as soon as the power is restored.

It is understood that while one specific embodiment of the invention has been described herein in which a five pole motor has been utilized, various other motors may be utilized having a greater number of poles.

With the arrangement of elements in accordance with this invention, a magnetic flux flowing between oppositely arranged energized magnets, passes through the armature pole faces in the region of least reluctance in each of its different positions.

For instance, in Figure 3, the armature is balanced magnetically as the force exerted through pole 5 is offset by an opposite force through pole 6. In Figure 4, the force exerted through pole 3 is offset by an opposite force through pole 5.

Assume now for some reason, that the face of the lower armature top 28, as in Figure 3, is not properly positioned but offset to the right of the central position shown. Then the torque effected through poles 3 and 5 remains substantially unchanged, but is greatly increased from pole 6, due to the decrease in the area of iron of armature pole face adjacent to the energized magnetic core. This torque tends to return the armature to the position shown in Figure 3. Similarly in Figure 4, if the lower armature face be moved to the right, the torque effect from pole 5 is not changed, but is increased from pole 3 tending to return the armature to the position of equilibrium shown in Figure 4.

It is clear therefore that for any special arrangement of energization of the electromagnets the armature assumes but one position and that a very definite one with the sharp edges on the different portions of the armature pole faces adjacent certain of the energized magnets.

It is not the intention to limit the invention to the particular embodiments disclosed, but only by the scope of the patented claims.

I claim:

1. An electric motor comprising at least five electromagnets having circularly arranged pole pieces having like polarity at their opposite ends, a polarized armature having pole faces adapted to cooperate with the ends of said pole pieces and means for energizing said magnets to position each armature pole face in four distinct positions relative to any energized magnet, in one of which the pole face is disposed centrally of the pole piece of said magnet, in another of which the pole face engages the pole piece of said magnet and a substantial portion of the pole piece of an adjacent magnet on one side of said magnet, a third position in which the pole face engages the said magnet and a substantial portion of the pole face of an adjacent magnet on the opposite side of said magnet and a fourth position in which the pole face is disposed centrally of said magnet and an adjacent magnet.

2. An electric motor comprising an armature provided with oppositely disposed pole faces of unlike polarity near its opposite ends, a plurality of electromagnets having pole-pieces surrounding said armature, the opposite ends of each pole-piece having like polarity, means for energizing said poles selectively to position the armature, each magnet when energized cooperating with oppositely arranged and energized magnets to position the armature in four definite positions for each magnet, said armature having pole pieces of width to span completely at least two electromagnets whereby the armature will be magnetically balanced in each definite position.

3. An electric motor comprising a rotor having armatures of maintained unlike polarity near its opposite ends, a plurality of electromagnets having pairs of reversed coil windings and a pole-piece common thereto, said pole-pieces surrounding said rotor each pole-piece having poles of like polarity, means for energizing said magnets selectively to position the armature, each energized magnet cooperating with oppositely arranged and energized magnets to position the armature in four definite positions for each magnet, said armature having pole pieces of width to span completely a magnetic pole piece and the space between said pole and an adjacent pole.

4. An electric motor comprising an armature, a plurality of electromagnets forming poles surrounding said armature and means for energizing said magnets selectively to position the armature, each magnet when energized co-operating with oppositely arranged and energized magnets to position the armature in definite positions, said armature being provided with pole pieces each having a portion of a width to span completely the poles of at least two electromagnets and another portion of a width to span completely the pole of at least one electromagnet and the space between said pole and an adjacent pole.

5. An electric motor comprising a rotary armature and a plurality of poles surrounding the armature, said armature having an arcuate pole face and being provided with a laterally extending flange having its outer face of the same radius of curvature as the pole face but subtending a lesser angle.

6. An electric motor having a rotary structure provided at its ends with armatures of opposite polarity and a magnetic field structure surrounding said rotary structure and comprising a set of magnets each of which has poles at its ends of like polarity adapted to cooperate with the armature.

7. An electric motor having a magnetic field structure comprising a plurality of electromagnets, an armature having arcuate pole faces co-operating with said magnets and means for energizing and de-energizing said magnets selectively to change the polarity thereof, the armature being provided at each end with a laterally extending flange the outer face of which has the same radius of curvature as the pole face of the armature but subtends a lesser angle, whereby the armature is magnetically balanced in its different positions and may assume but one definite position for any selected arrangement of energized magnets.

8. An electric motor having a field structure comprising five electromagnets having pole-pieces the opposite ends of which have like polarity circularly arranged, a polarized armature having pole-faces co-operating with said pole-piece ends, and means for energizing said magnets selectively so that the armature may assume any one of twenty different positions due to the arrangement of magnets energized the relation of the magnet pole-piece ends and armature pole faces causing the motor to be self-synchronous.

9. An electric motor having a field structure comprising five electromagnets circularly arranged, a polarized armature co-operating therewith and provided with segmental, laterally flanged pole pieces having arcuate pole faces of unvarying curvature and varying widths to give regions of different reluctance and means for energizing the magnets selectively so that the armature may assume any one of twenty different positions due to the arrangement of magnets energized and be magnetically balanced in each position.

10. In an electric motor, an armature having pole-pieces, electromagnets circularly arranged around said armature and provided with pole-pieces having poles of like polarity and means for energizing and de-energizing said magnets in a predetermined sequence, said armature being provided with segmental, laterally flanged pole pieces to give regions of different reluctance, said armature pole-pieces being of unlike polarity and on opposite sides of said magnets whereby the armature will assume different positions relative to the energized magnets and be magnetically balanced in accordance with any predetermined arrangement of energized magnets.

11. In an electric motor, an armature comprising a rotor and a stationary polarizing coil, a support for said coil, electromagnets circularly arranged around the armature and having pole-pieces retaining said coil support, and means for energizing and de-energizing the magnets on opposite sides in a predetermined sequence, said armature being provided with segmental, laterally flanged pole pieces to give regions of different reluctance, whereby the armature will assume four definite positions relative to each energized magnet and be magnetically balanced in accordance with any predetermined arrangement of energized magnets in each position.

12. In an electric motor, a field structure comprising a series of electromagnets having pole-pieces protruding from their opposite sides, an armature having arcuate pole faces opposed to the protruding portions of said pole pieces said arcuate pole faces being of uniform curvature and varying widths to give regions of different reluctance and means for energizing and de-energizing the magnets to change their polarity selectively, said armature shifting to present that region having the least reluctance to the magnetic flux according to the arrangement of magnets energized.

13. In an electric motor, a field structure comprising a series of electromagnets, an armature comprising a rotor provided with pole pieces near its opposite ends and a polarizing coil, a coil support passed through by said rotor intermediate said armature pole pieces, the latter having faces of varying width to give regions of different reluctance and means for energizing and de-energizing the magnets to change their polarity selectively, said armature shifting to four definite positions for each magnet energized to present that region having the least reluctance to the magnetic flux according to the arrangement of magnets energized.

14. In an electric motor, a plurality of circularly arranged magnetic field structures, means for energizing said structures selectively to provide a plurality of paths of magnetic flux, an armature polarizing coil, a support therefor, said magnetic field structures having axially aligned separated coils in the space between which said support is located, an armature provided with segmental, laterally flanged pole pieces to give regions of different reluctance and means for controlling the energization of said structures to polarize fields on opposite sides of the armature selectively to cause the armature to be turned to a definite position to present that region to the path of magnetic flux having the least reluctance for the arrangement of fields so polarized.

15. In an electric motor, a plurality of circularly arranged magnetic field structures having axially aligned separated coils, means for energizing said structures selectively to provide a plurality of paths of magnetic flux, an armature comprising a rotor and a polarizing coil therefor, a support for said coil passed through by said rotor said coil support being retained by said field structures in the space between said aligned coils, said armature being provided with segmental, laterally flanged pole pieces to give regions of different reluctance and means for controlling energization of said structures to polarize fields on opposite sides of the armature selectively to cause the armature to be turned to four definite positions for each structure energized to present that region to the path of magnetic flux having the least reluctance for the arrangement of structures so polarized.

16. In an electric motor, a field structure comprising at least five electromagnets having pole-pieces both ends of which act as armature attracting poles, an armature co-operating therewith and having a shaft, end and intermediate members rigidly combined with said pole-pieces and in which said shaft turns, means for energizing one magnet on one side of the armature and two magnets on the opposite side, and alternative means for energizing one magnet on one side and a magnet on the opposite side but offset from the first magnet, these magnets being selectively polarized to position the armature in a predetermined manner.

17. In an electric motor, a field structure comprising a plurality of electromagnets circularly arranged, an armature co-operating therewith and having a rotor provided with axially spaced oppositely arranged pole faces spanning at least two adjacent magnets, means for energizing said magnets selectively to polarize an even number of magnets on one side and an odd number of magnets on the opposite side of the armature, a coil support located between axially separated pairs of said magnets and armature polarizing coils carried on opposite sides of said support.

18. In an electric motor, a field structure comprising a plurality of electromagnets circularly arranged, an armature co-operating therewith having oppositely arranged pole faces of continuously uniform radius and varying width said pole faces spanning an odd number of magnets and an adjacent space between magnets, means for energizing said magnets selectively to polarize an equal number of magnets arranged on opposite sides of the armature, one set being offset from the other and means having a fixed relation to the electromagnets for polarizing the armature.

19. In an electric motor, a field structure comprising a plurality of electromagnets circularly arranged, an armature co-operating therewith comprising a rotor, pole-pieces adjustably mounted thereon near its opposite ends said pole-pieces having oppositely arranged pole faces each having one section spanning at least two adjacent magnets and another section spanning an odd number of magnets and an adjacent space between magnets, means to selectively energize an even number of magnets on one side and an odd number of magnets on the opposite side of the armature, or an equal number of magnets arranged on opposite sides of the armature one set being offset from the other.

20. In an electric motor, a field structure comprising a plurality of electromagnets circularly arranged, an armature cooperating therewith having oppositely arranged pole pieces each having an arcuate face spanning at least two adjacent magnets and a flange extending laterally therefrom and subtending a lesser angle and spanning at least one magnet and the space between said magnet and an adjacent magnet and means to selectively energize an even number of magnets on one side and an odd number of magnets on the opposite side of the armature, or an equal number of magnets arranged on opposite sides of the armature one set being offset from the other.

21. An electric motor comprising a frame, a plurality of circularly arranged electromagnets mounted in the frame and provided with pole pieces at their ends, an armature shaft rotatably mounted in the frame, an armature attached to each end of the shaft and coacting with the pole pieces, a supporting member attached to the electromagnets and provided with an aperture through which the armature shaft passes, a coil mounted on the member and surrounding the shaft, means for energizing the coil to polarize the armatures and means for energizing the electromagnets in a predetermined sequence to cause a step-by-step movement of the armatures and their shaft.

22. An electric motor comprising a frame, a plurality of circularly arranged magnetic cores mounted in the frame, coils surrounding the cores, the ends of the cores forming pole pieces, an armature shaft rotatably mounted in the frame, oppositely extending armatures attached to the ends of the shaft and coacting with the pole pieces, a supporting member fitted between the cores intermediate their ends and provided with an aperture through which the armature shaft passes, coils mounted on the member on each side and surrounding the armature shaft, means for energizing the last named coils to oppositely polarize the armatures, and means for energizing the first named coils to produce like polarity of the corresponding cores, said coils being energized in a predetermined sequence to cause a step-by-step movement of the armatures and their shaft.

23. An electric motor comprising a plurality of electromagnets having circularly arranged pole pieces, an armature having arcuate pole faces adapted to co-operate with the pole pieces and each composed of portions having equal radii of curvature but subtending different angles and means for energizing said magnets to position each armature pole face in a plurality of definite positions relative to any energized magnet, in each of which an edge of a portion of the pole face coincides with an edge of the pole piece of the magnet.

24. An electric motor comprising at least five electromagnets having circularly arranged pole pieces, a polarized armature having arcuate pole faces adapted to co-operate with the pole pieces and each composed of portions having equal radii of curvature but subtending different angles and means for energizing said magnets to position each armature pole face in four definite positions relative to any energized magnet, in each of which an edge of a portion of the pole face coincides with an edge of the pole piece of the magnet.

25. An electric motor comprising a rotary armature and a plurality of poles surrounding the armature, said armature having arcuate pole faces adapted to co-operate with the pole pieces and each composed of portions having equal radii of curvature but subtending different angles.

26. An electric motor having a field structure comprising five electromagnets having circularly arranged pole pieces provided with pole faces, a polarized armature co-operating therewith and provided with pole faces having inner and outer edges of unequal length both of which edges are of greater length than the pole faces of said magnet pole-pieces, and adapted to assume any one of twenty definite positions in each of which two edges of each pole face of the armature coincide with edges of the pole pieces of the magnets and means for energizing the magnets selectively to cause said armature to assume said positions due to the arrangement of magnets energized.

In testimony whereof, I affix my signature.

HANNIBAL C. FORD.